(12) United States Patent
Washizu et al.

(10) Patent No.: US 8,993,016 B2
(45) Date of Patent: Mar. 31, 2015

(54) FLAVOR ENHANCER FOR FOOD OR DRINK, PRODUCTION METHOD THEREOF, AND FOOD OR DRINK COMPRISING FLAVOR ENHANCER

(75) Inventors: Yukio Washizu, Kanagawa (JP); Eiji Emoto, Kanagawa (JP); Masaharu Kono, Kanagawa (JP)

(73) Assignee: Takasago International Corporation, Tokyo (JP)

( * ) Notice: Subject to any disclaimer, the term of this patent is extended or adjusted under 35 U.S.C. 154(b) by 226 days.

(21) Appl. No.: 12/595,665

(22) PCT Filed: Mar. 21, 2008

(86) PCT No.: PCT/JP2008/055315
§ 371 (c)(1),
(2), (4) Date: Oct. 13, 2009

(87) PCT Pub. No.: WO2008/129918
PCT Pub. Date: Oct. 30, 2008

(65) Prior Publication Data
US 2010/0112129 A1   May 6, 2010

(30) Foreign Application Priority Data

Apr. 18, 2007  (JP) ................. 2007-109640

(51) Int. Cl.
*A23C 9/12*  (2006.01)
*A23L 1/22*  (2006.01)
*A23L 1/23*  (2006.01)
*A23L 2/56*  (2006.01)

(52) U.S. Cl.
CPC ........... *A23L 1/2305* (2013.01); *A23L 1/22091* (2013.01); *A23L 2/56* (2013.01)
USPC .................. 426/35; 426/63; 426/42; 426/34; 426/580

(58) Field of Classification Search
USPC ......................................................... 426/35
See application file for complete search history.

(56) References Cited

U.S. PATENT DOCUMENTS

| | | | | |
|---|---|---|---|---|
| 3,975,544 | A | * | 8/1976 | Kosikowski .................... 426/35 |
| 4,244,971 | A | * | 1/1981 | Wargel et al. .................... 426/35 |
| 4,675,193 | A | * | 6/1987 | Boudreaux .................... 426/35 |
| 4,699,793 | A | | 10/1987 | Eguchi et al. |
| 4,708,876 | A | | 11/1987 | Yokoyama et al. |

FOREIGN PATENT DOCUMENTS

| | | |
|---|---|---|
| EP | 0981965 A1 | 3/2000 |
| EP | 1053689 A2 | 11/2000 |
| JP | 49-94875 A | 9/1974 |
| JP | 61-152235 A | 7/1986 |
| JP | 61-242542 A | 10/1986 |
| JP | 62-151155 A | 7/1987 |
| JP | 5-49385 A | 3/1993 |
| JP | 591851 A | 4/1993 |
| JP | 9-37735 A | 2/1997 |
| JP | 11-69942 A | 3/1999 |
| JP | 2875825 B2 | 3/1999 |
| JP | 3274792 B2 | 4/2002 |
| JP | 3383461 B2 | 3/2003 |
| JP | 2004-267126 A | 9/2004 |
| JP | 2007185177 A | 7/2007 |

OTHER PUBLICATIONS

"Utilization of Enzyme Flavoring", New Food Industry. 1984, pp. 37-41, vol. 26, No. 11.
Kamoi, Ikuzo, "Cheese", Shokuhin Kogyo Gijutsu Gaisetsu (Food Technology Overview). 1997. pp. 160-161, Published by Koseisha-Koseikaku Corporation.
Communication issued Jun. 9, 2010 in counterpart Japanese Patent Application No. 2007-109640.
International Search Report for PCT/JP2008/055315 dated May 1, 2008 [PCT/ISA/210].
Written Opinion PCT/JP2008/055315 [PCT/ISA/237].
Chinese Patent Office, Communication dated Feb. 23, 2012 issued in corresponding Chinese Application No. 200880012432.7.
Japanese Patent Office, Communication dated Apr. 10, 2012, issued in corresponding Japanese Patent Application No. 2007-109640.
Japanese Patent Office, Office Action dated Feb. 19, 2013 issued in counterpart Japanese Application No. 2007-109640.
State Intellectual Property Office of P.R.C , Communication dated Jun. 4, 2013 issued in corresponding Chinese Application No. 200880012432.7.
State Intellectual Property Office of P.R. China, Communication dated Nov. 1, 2012 issued in a counterpart Chinese application No. 200880012432.7.
Office Action issued by the State Intellectual Property Office of People's Republic of China, dated Sep. 3, 2014 in counterpart Chinese application No. 200880012432.7.
State Intellectual Property Office of P.R. China, Communication, dated May 7, 2014, issued in counterpart Chinese Patent Application No. 200880012432.7.

* cited by examiner

Primary Examiner — Michele L Jacobson
Assistant Examiner — Jeffrey Mornhinweg
(74) Attorney, Agent, or Firm — Sughrue Mion, PLLC

(57) ABSTRACT

To provide a flavor enhancer having, in a good balance, a raw milk feeling which gives a flavor of a fresh milk, a rich feeling of the raw milk, a natural feeling, and a preference property. That is the flavor enhancer for food or drink, which comprises, as an effective component, a treated product which is obtained by subjecting a total milk protein to a lactic acid fermentation treatment and protease treatment.

10 Claims, No Drawings

FLAVOR ENHANCER FOR FOOD OR DRINK, PRODUCTION METHOD THEREOF, AND FOOD OR DRINK COMPRISING FLAVOR ENHANCER

TECHNICAL FIELD

The present invention relates to a flavor enhancer having a flavor of dairy products. Particularly, the invention relates to a flavor enhancer which enhances or increases to food or drink, a raw milk feeling which gives a flavor of a fresh milk, and a rich feeling of the raw milk (also called a full body or a thickness).

BACKGROUND OF THE INVENTION

Up to now, flavorings or taste improvers and the like obtained by carrying out a protease treatment of milk and dairy products have been proposed. So far, it has been proposed a method for producing a natural flavoring for dairy products comprising an enzyme treated product obtained by allowing a protease treated product of whey to contact with an adsorbent and then eluting with an ethyl alcohol solution (Patent Reference 1). However, the method described in Patent Reference 1 requires a large scale device for adsorption by the adsorbent and elution, and its operation was complex. In addition, there was a problem of losing a raw milk feeling and a thickness caused by the adsorbent.

Flavorings or taste improvers obtained by carrying out a protease treatment and a lactic acid fermentation of milk and dairy products have also been proposed. For example, an aromatic substance prepared by heating a liquid product obtained by subjecting a dairy product containing carbohydrates to an enzymatic protein hydrolysis and (or) lactic acid fermentation (Patent Reference 2). In addition, there has been reported a seasoning in which a lactic acid bacterium is inoculated into cheese whey which is then divided into a precipitation portion containing protein as a main component and a supernatant portion by carrying out centrifugation under heating or without heating, and the precipitation portion is treated with a protease and mixed with the supernatant portion (Patent Reference 3). However, since the flavor enhancers obtained by the methods described in Patent References 2 and 3 contain a large amount of sugar in the dairy products which become the substrate, when heated after the protease treatment, Maillard reaction which is a reaction of amino acids with reducing sugars is generated so that a scorched odor, a caramel odor or a nuts-like odor is generated, thus resulting in a rich flavor enhancer having a flavor of baked food but not having a flavor of fresh raw milk.

In addition to these, it has been proposed to allow a lipase, a protease and a lactic acid bacterium to act upon a substrate containing a milk fat such as fresh cream (cream), or butter and skim milk powder as a milk protein (Patent references 4 and 5). However, the product described in Patent reference 4 is a fermented milk flavoring having a condensed-milk flavor and is not a taste improver having a flavor of fresh raw milk. Also, in the methods described in Patent references 4 and 5, skim milk powder is used as the milk protein. Since about 50% by mass or more of lactose is contained in skim milk powder, when heated for enzyme inactivation, sterilization and the like after the protease treatment, Maillard reaction which is a reaction of reducing sugars with amino acids is generated, thus posing a problem of causing generation of various odors such as a scorched odor, a caramel odor, and a nuts-like odor. In addition, the taste improver described in Patent Reference 5 is aimed at getting rid of a powdery odor by adding it at the time of producing bread and therefore is not a taste improver having a flavor of fresh raw milk.

A low antigenicity casein hydrolyzate having improved flavor and absorption property has been reported (Patent Reference 6). In addition, a taste improver for food or drink in which a protease treated product of milk serum protein was used in combination with a lipase-treated product of milk fat has also been reported (Patent Reference 7). However, those which are described in Patent References 6 and 7 are a taste improver and the like which mask a foul taste or a foul smell of food or drink. Thus, these were not the flavor enhancers which give a flavor of fresh raw milk (particularly a raw milk feeling) and a full body or a thickness of raw milk, totally in a good balance.

Patent Reference 1: JP-A-2004-267126
Patent Reference 2: JP-A-49-94875
Patent Reference 3: JP-A-62-151155
Patent Reference 4: Japanese Patent No. 2875825
Patent Reference 5: JP-A-5-49385
Patent Reference 6: Japanese Patent No. 3383461
Patent Reference 7: Japanese Patent No. 3274792

DISCLOSURE OF THE INVENTION

Problems that the Invention is to Solve

The invention aims at providing a flavor enhancer having, in a good balance, a raw milk feeling which gives a flavor of a fresh milk, and a rich feeling of the raw milk (also called a full body or a thickness). In addition, the invention aims at providing a method for producing said flavor enhancer, and a food or drink in which a raw milk feeling as a flavor of a fresh milk, a rich feeling of the raw milk and a preference property are enhanced or increased in a good balance by formulating said flavor enhancer.

Means for Solving the Problems

With the aim of solving the above-mentioned problems, the present inventors have conducted intensive studies and found as a result that there can be obtained a flavor enhancer which enhances or increases to food or drink a raw milk feeling which gives a flavor of a fresh milk, and a rich feeling of the raw milk in a good balance, by subjecting a total milk protein to a lactic acid fermentation treatment and a protease treatment.

Also, it was found that a synergistic effect can be obtained when a treated product obtained by subjecting a total milk protein to a lactic acid fermentation treatment and a protease treatment is used in combination with a lipase-treated product of milk fat, so that a flavor enhancer rich in a natural feeling having a good balance between flavor and taste can be obtained.

In addition, it was found that a flavor enhancer rich in a natural feeling having a good balance between flavor and taste can be obtained, by subjecting a mixture of a total milk protein and a milk fat to a lactic acid fermentation treatment, a protease treatment and a lipase treatment.

That is, the invention includes the following.

1. A flavor enhancer for food or drink, which comprises, as an effective component, a treated product which is obtained by subjecting a total milk protein to a lactic acid fermentation treatment and a protease treatment.
2. The flavor enhancer according to the above item 1, which further comprises a lipase-treated product of a milk fat as an effective component.

3. A flavor enhancer for food or drink, which comprises, as an effective component, a treated product which is obtained by subjecting a mixture of a total milk protein and a milk fat to a lactic acid fermentation treatment, a protease treatment and a lipase treatment.
4. A food or drink, which comprises the flavor enhancer according to any one of the above items 1 to 3.
5. A method for producing a flavor enhancer for food or drink, which comprises:
    (1) subjecting a total milk protein to a lactic acid fermentation treatment and a protease treatment.
6. The method according to the above item 5, which further comprises:
    (2) adding a lipase-treated product of a milk fat to the treated product obtained by the step (1).
7. A method for producing a flavor enhancer for food or drink, which comprises:
    (1) preparing a mixed solution which comprises a total milk protein and a milk fat; and
    (2) subjecting the mixed solution prepared by the step (1) to a lactic acid fermentation treatment, a protease treatment and a lipase treatment.
8. A flavor enhancer for food or drink, which is obtained by the method according to any one of the above items 5 to 7.

ADVANTAGE OF THE INVENTION

By the invention, there can be obtained a flavor enhancer which can improve a raw milk feeling which gives a flavor of a fresh milk, and a rich feeling of the raw milk in a good balance. In addition, by formulating the flavor enhancer of the invention in food or drink, a raw milk feeling and a rich feeling of the raw milk can be enhanced or increased to the food or drink, in a good balance, so that food or drink excellent in preference property can be provided.

BEST MODE FOR CARRYING OUT THE INVENTION

The following describes embodiments of the invention.

The flavor enhancer of the invention comprises, as an effective component, a treated product which is obtained by subjecting a total milk protein to a lactic acid fermentation treatment and a protease treatment. In this case, regarding order of the protease treatment and lactic acid fermentation treatment, either of them may be the first and it can be optionally controlled depending on the kinds of the lactic acid bacterium and protease. In addition, the protease treatment and lactic acid fermentation treatment can also be carried out at the same time.

(Total Milk Protein)

According to the present description, the "total milk protein" (also called milk protein concentrate or Milk Protein Isolate) means a product prepared by spray-drying a concentrate which contains both of the casein protein and whey protein (also called milk serum protein) in milk at the same ratio in milk, and is distinguished from the milk serum protein, casein protein and skim milk powder.

The total milk protein comprises about 80 to 90% of protein and several % or less of ash, lactose, water and lipid. The lactose content of total milk protein is at a level of several % because lactose is removed during its production process, which is considerably low in comparison with the skim milk powder and the like that are used as raw materials of a flavor enhancer and the like. Accordingly, the Maillard reaction, which is a reaction of reducing sugars with amino acids formed by a protease treatment in the heat treatment step, hardly occurs, so that a flavor enhancer which improves a raw milk feeling which gives a flavor of a fresh milk and a rich feeling of the raw milk, in a good balance, can be obtained.

In addition, when the total milk protein which contains both of the casein protein and whey protein at a ratio close to that of the raw milk is used as a raw material, the flavor enhancer of the invention can enhance or increase a raw milk feeling which gives a flavor of a fresh milk and a rich feeling of the raw milk, in a good balance.

The total milk protein is broadly available on the market, and its examples include Milk Protein Concentrate MPC 80 (manufactured by DMV International), Total Milk Protein (manufactured by Morinaga Milk Industry Co., Ltd.), MILKA (manufactured by Nippon Shinyaku Co., Ltd.), REFIT(R) Natural (manufactured by DMV International) and the like.

When total milk protein is subjected to a lactic acid fermentation treatment and a protease treatment, the total milk protein is dissolved or dispersed in water or hot water in advance. Though concentration of said dissolution liquid is not particularly limited, it is desirable to carry out the treatment by suspending it at a protein concentration of generally from 5 to 40% by mass, preferably from 5 to 30% by mass.

(Lactic Acid Fermentation Treatment)

The lactic acid bacterium to be used in the lactic acid fermentation treatment is not particularly limited, and for example, a bacterium of the genus *Lactobacillus*, a bacterium of the genus *Streptococcus*, a bacterium of the genus *Lactococcus*, a bacterium of the genus *Leuconostoc*, a bacterium of the genus *Enterococcus* and the like can be cited.

As the bacterium of the genus *Lactobacillus*, for example, *Lactobacillus casei*, *Lactobacillus acidophilus* and *Lactobacillus helveticus* can be cited. As the bacterium of the genus *Streptococcus*, for example, *Streptococcus diacetilactis* and *Streptococcus thermophilus* can be cited. As the bacterium of the genus *Lactococcus*, for example, *Lactococcus lactis* subsp. *lactis* and *Lactococcus lactis* subsp. *cremoris* can be cited. As the bacterium of the genus *Leuconostoc*, for example, *Leuconostoc mesenteroides* subsp. *cremoris* and *Leuconostoc lactis* can be cited. As the bacterium of the genus *Enterococcus*, for example, *Enterococcus malodoratus* can be cited. These lactic acid bacteria may be used as a one species alone or may be used in combination of two or more species.

It is desirable to carry out the lactic acid fermentation by inoculating for example $10^5$ cfu/ml or more, though not particularly limited, of a concentrated or pre-cultured lactic acid bacterial seed, based on the total mass of a reaction solution (medium) to be subjected to the lactic acid fermentation treatment. In addition, as occasion demands, the lactic acid fermentation can be carried out by adding utilizable amount and kind of sugar to the reaction solution as the carbon source. It is desirable that the amount of the sugar to be added to the reaction solution (medium) until the preceding steps is within the range of from about 1 to 5% by mass based on the total mass of the reaction solution. This is because when the amount of sugar is set to 5% by mass or more, there is a possibility of generating Maillard reaction by the heating treatment after the protease treatment, and thereby exerting a bad influence on the flavor.

As the carbon source, for example, lactose, sugars other than lactose, milk and dairy products containing lactose or other sugars, and the like can be cited. These sugar may be used as one species alone or may be used as a combination of two or more species.

The fermentation temperature is not particularly limited and can be optionally adjusted depending on the kind of lactic acid bacterium or the like, but it is desirable to carry out the fermentation at approximately from 25 to 45° C. The fermentation time is not particularly limited too, and for example, the time of from 4 to 75 hours is desirable. In addition, regarding the fermentation method, a method suited for the fermentation of the lactic acid bacterium to be used can be optionally selected from a static fermentation, an agitated fermentation, an aerated fermentation or the like.

(Protease Treatment)

The protease to be used in the protease treatment is an enzyme which catalyzes hydrolysis reaction of peptide bonds, and proteases of microbial origin, plant origin and animal organ origin can be used. As such protease, for example, endopeptidases such as serine protease, cystine protease, aspartic protease and metalloprotease, and exopeptidases such as aminopeptidase, dipeptidase, dipeptidylaminopeptidase, dipeptidylcarboxypeptidase, serinecarboxypeptidase and metallocarboxypeptidase can be cited. Most of these enzymes are available on the market and can be easily obtained. For example, Protease N "Amano" G (manufactured by Amano Enzyme Inc.), Flavorzyme 1000L (manufactured by Novozymes), Denapsin 2P (manufactured by Nagase Chemtex Corporation), Kokulase P (manufactured by SANKYO), a purified papain for food (manufactured by Nagase Chemtex Corporation) Debitrase (manufactured by Banpoh Trading Co., Ltd.), Protease A "Amano" G (manufactured by Amano Enzyme Inc.), Protease YP-SS (manufactured by Yakult Pharmaceutical Industry) and the like can be cited. These proteases may be used as one species alone or may be used as a combination of two or more species. In addition, any protease of acid proteases, neutral proteases and alkaline proteases can also be used.

It is desirable that the amount of the protease to be used in carrying out the protease treatment is set to a range of from 10 to 3000 units per 1 g of a milk protein. In addition, the reaction temperature for the protease treatment is not particularly limited, but is set to such a range that it includes the optimum temperature for expressing the enzyme activity. In general, it is desirable to set to a range of from 30° C. to 70° C., but it is desirable to set it to a lower temperature than a higher temperature so that a fresh feeling of a raw milk is not spoiled.

The pH at the time of the protease treatment is not particularly limited, but in general, it is desirable to set to the optimum pH of the protease to be used. In addition, the protease treatment can be carried out without particularly adjusting pH. The reaction time of protease can be optionally adjusted, but it is desirable to set it to a range of generally from 1 to 96 hours.

The protease reaction is stopped by inactivation of the protease, by heating at a temperature for a period of time in accordance with the inactivation conditions of the protease to be used. It is desirable to carry out the heating within a necessary range so that a fresh feeling of a raw milk is not spoiled. For example, it can be inactivated by heating at from 70 to 90° C. for 10 to 30 minutes or at a high temperature of 120° C. or more for several seconds.

(Lipase-Treated Product of Milk Fat)

It is desirable that the flavor enhancer of the invention contains a lipase-treated product of a milk fat as a milk-type natural flavoring material, as an effective component, in a treated product obtained by subjecting a total milk protein to a lactic acid fermentation treatment and a protease treatment. By blending a lipase-treated product of a milk fat, full body, raw milk feeling, preference property and natural feeling are markedly improved.

Blending ratio of the treated product obtained by subjecting a total milk protein to a lactic acid fermentation treatment and a protease treatment with the lipase-treated product of a milk fat is not particularly limited and can be optionally adjusted, but it is desirable to set to a range of from 1:99 to 99:1 (mass ratio), and it is more desirable to set to a range of from 10:90 to 90:10 (mass ratio).

Also, the flavor enhancer of the invention may comprise, as an effective component, a treated product obtained by subjecting a mixture of a total milk protein and a milk fat to a lactic acid fermentation treatment, a protease treatment and a lipase treatment. This is because full body, raw milk feeling, preference property and natural feeling can also be enhanced or increased by the treated product obtained by subjecting said mixture to a lactic acid fermentation treatment, a protease treatment and a lipase treatment. In this case, the protease treatment and lactic acid fermentation treatment are carried out in the same manner as the above-mentioned treatments. Also, order of the protease treatment, lactic acid fermentation treatment and lipase treatment is not particularly limited, and it may be started from any treatment. In addition, the protease treatment, lactic acid fermentation treatment and lipase treatment can also be carried out at the same time.

As the milk fat, for example, milk fats and milk fat-containing products such as milk, butter, fresh cream and butter oil can be cited. Kind of the lipase for treating milk fat is not particularly limited. For example, lipases derived from microorganisms such as the genus *Aspergillus*, the genus *Mucor* and the genus *Rhizopus*, a lipase derived from porcine pancreas and oral lipases derived from laryngeal secretory glands of a kid, a lamb, a calf and the like, and the like can be optionally used. These lipases may be used as one species alone or may be used as a combination of two or more species.

It is desirable to set the using amount of lipase to a range of from 1 to 200 units per 1 g of a milk fat. Reaction temperature for the lipase treatment is not particularly limited, but is selected from a range which includes the optimum temperature for expressing the enzyme activity. In general, it is desirable to set to a range of from about 20 to about 70° C. The pH at the time of the lipase treatment is not particularly limited, but in general, it is desirable to set to the optimum pH of the lipase to be used. In addition, the lipase treatment can be carried out without particularly adjusting pH. It is desirable to set the reaction time of lipase to a range of from 3 to 75 hours.

Regarding stopping of the lipase reaction, lipase is inactivated by heating at a temperature in accordance with the inactivation conditions of the lipase to be used. The lipase-treated product of a milk fat may be added directly to a treated product obtained by subjecting a total milk protein to a lactic acid fermentation treatment and a protease treatment, or a concentrate in which said lipase-treated product was concentrated may be added thereto.

The treated product obtained by subjecting a total milk protein to a lactic acid fermentation treatment and a protease treatment can be directly used as a flavor enhancer. In addition, a product in which a lipase-treated product of a milk fat is formulated in said treated product, and a treated product obtained by subjecting a mixture of a total milk protein and a milk fat to a lactic acid fermentation treatment, a protease treatment and a lipase treatment, can also be used directly as a flavor enhancer in the same manner.

Regarding the flavor enhancer of the invention, other optional component may be formulated in a treated product obtained by subjecting a total milk protein to a lactic acid fermentation treatment and a protease treatment, a product in which a lipase-treated product of a milk fat is formulated in said treated product or a treated product obtained by subjecting a mixture of a total milk protein and a milk fat to a lactic acid fermentation treatment, a protease treatment and a lipase treatment. As the other optional component, for example, seasoning such as an amino acid, a flavoring and flavoring composition such as a natural essential oil and an essence, and the like can be cited. As such flavoring and flavoring composition, for example, a milk-type natural flavoring material, a synthesized flavoring material, a milk flavoring prepared by mixing both of them, and the like can be cited.

Usage embodiment of the flavor enhancer of the invention is not particularly limited, and the treated product obtained by subjecting a total milk protein to a lactic acid fermentation treatment and a protease treatment, the product in which a lipase-treated product of a milk fat is formulated in said treated product or the treated product obtained by subjecting a mixture of a total milk protein and a milk fat to a lactic acid fermentation treatment, a protease treatment and a lipase treatment may be in the form of a mixture with an appropriate diluent or carrier. As such a diluent or carrier, for example, solid diluents such as dextrin, total milk protein, gum arabic or sucrose or carriers, and liquid diluents such as water, ethanol, propylene glycol, glycerin or a surfactant or carriers, and the like can be cited.

The flavor enhancer of the invention can also be made into a flavor enhancer by optionally preparing into powdery forms, granular forms, solution forms, emulsion forms, paste forms and other dosage forms. For example, it can be made into a powdery form or granular form by adding carriers such as gum arabic or dextrin, into a liquid form by dissolving in solvents such as ethanol, propylene glycol or glycerin, into a paste form by adding sugars such as sucrose or oils and fats such as palm oil, or into an emulsion by adding an emulsifier.

The flavor enhancer of the invention can be formulated during a production step of food or drink. The mixable food or drink extend over broad ranges such as various types of drinks, cold sweets, baked sweets, dairy products, cooked food, and their examples include drinks such as coffee, café au lait, milk tea and yogurt drink; cold sweets such as ice cream, ice milk, lacto ice and sherbet; dairy products such as cheese, yoghurt and margarine; desserts such as pudding, mousse and cake; confectioneries such as cookie, snack, gum and candy; seasonings such as dressing and mayonnaise; cooked food such as stew and curry; creams and the like can be cited. Amount of the flavor enhancer of the invention when formulated in food or drink is not particularly limited and can be optionally adjusted depending on the kinds of food or drink, but it is desirable to set it to a range of generally from 0.005 to 1% by mass, based on the total mass of food or drink.

EXAMPLES

The following describes the invention further illustratively based on examples, but the invention is not restricted by these examples.

1. Preparation of Flavor Enhancers

Example 1

Preparation of Flavor Enhancer A 6.0 g of a total milk protein (trade name: MILKA (manufactured by Nippon Shinyaku Co., Ltd.)) and 1.0 g of lactose (manufactured by DMV) were dissolved in 65.0 g of water, followed by sterilizing at 90° C. for 10 minutes and cooling to 35° C. Thereafter, 1% by mass ($10^6$ cfu/ml) of a seed of pre-cultured Lactococcus lactis was inoculated and statically cultured at 35° C. for 18 hours, followed by sterilizing at 90° C. for 10 minutes to obtain a treated product of lactic acid fermentation (lactic acid fermentation treatment).

After cooling said treated product of lactic acid fermentation to 50° C., 0.35 g (350 units) of a protease (Flavorzyme 1000 L, manufactured by Novozymes) and 0.05 g (750 units) of a protease (Protease N "Amano" G, manufactured by Amano Enzyme Inc.) were dissolved in 4.00 g of water, followed by adding thereto and stirring at 50° C. for 20 hours to carry out hydrolysis (protease treatment). After inactivating the protease by treating at 90° C. for 10 minutes, 0.1 part by weight of a total milk protein (manufactured by Nippon Shinyaku Co., Ltd.) was mixed as a carrier based on 1 weight part of said solution, followed by spray-drying to obtain a flavor enhancer A.

Example 2

Preparation of Flavor Enhancer B 15 g of a total milk protein (trade name: MILKA (manufactured by Nippon Shinyaku Co., Ltd.)), 20 g (16.6 g milk fat) of salt-free butter (manufactured by Snow Brand Milk Products Co., Ltd.) and 2.0 g of lactose (manufactured by DMV) were dissolved in 63.0 g of water, followed by sterilizing at 90° C. for 10 minutes and cooling to 35° C. Thereafter, 1% by mass ($10^6$ cfu/ml) of a seed of pre-cultured Lactococcus lactis was inoculated and statically cultured at 35° C. for 18 hours, followed by sterilizing at 90° C. for 10 minutes to recover a treated product of lactic acid fermentation treatment.

After cooling said treated product of lactic acid fermentation to 50° C., 0.35 g (350 units) of a protease (Flavorzyme 1000 L, manufactured by Novozymes), 0.1 g (1500 units) of a protease (Protease N "Amano" G, manufactured by Amano Enzyme Inc.) and 0.05 g (1500 units) of a lipase (Lipase AY30G, manufactured by Amano Enzyme Inc.) were dissolved in 4.00 g of water, followed by adding to said treated product and stirring at 50° C. for 20 hours to carry out hydrolysis (protease treatment and lipase treatment). After inactivating the proteases and lipase by treating at 90° C. for 10 minutes, a flavor enhancer B was obtained.

Production Example 1

Preparation of Milk Fat Lipase-Treated Product I 0.05 g (1500 units) of a lipase (Lipase AY30G, manufactured by Amano Enzyme Inc.) was dissolved in 0.45 g of water, followed by adding to 49.50 g (milk fat 41.09 g) of salt-free butter (manufactured by Snow Brand Milk Products Co., Ltd.) and stirring at 50° C. for 20 hours to carry out hydrolysis (lipase treatment). After inactivating the lipase by treating at 90° C. for 10 minutes, the milk fat lipase-treated product I was obtained by carrying out emulsification with a homogenizer.

Comparative Example 1

Preparation of Flavor Enhancer a 6.0 g of a whey protein (WPC 80, manufactured by Warrnambool Cheese and Butter Factory) and 0.3 g of lactose (manufactured by DMV) were dissolved in 65.0 g of water, followed by sterilizing at 90° C. for 10 minutes and cooling to 35° C. Thereafter, 1% by mass ($10^6$ cfu/ml) of a seed of pre-cultured Lactococcus lactis was inoculated and statically cultured at 35° C. for 18 hours, followed by sterilizing at 90°

C. for 10 minutes to obtain a treated product of lactic acid fermentation (lactic acid fermentation treatment).

After cooling said treated product of lactic acid fermentation to 50° C., 0.35 g (350 units) of a protease (Flavorzyme 1000 L, manufactured by Novozymes) and 0.10 g (1500 units) of a protease (Protease N "Amano" G, manufactured by Amano Enzyme Inc.) were dissolved in 4.00 g of water, followed by adding thereto and stirring at 50° C. for 20 hours to carry out hydrolysis (protease treatment). After inactivating the proteases by treating at 90° C. for 10 minutes, 0.1 part by weight of a total milk protein (manufactured by Nippon Shinyaku Co., Ltd.) was mixed as a carrier based on 1 weight part of said solution, followed by spray-drying to obtain the flavor enhancer a.

Comparative Example 2

Preparation of Flavor Enhancer b 6.0 g of skim milk powder (manufactured by Snow Brand Milk Products Co., Ltd.) and 0.3 g of lactose (manufactured by DMV) were dissolved in 65.0 g of water, followed by sterilizing at 90° C. for 10 minutes and cooling to 35° C. Thereafter, 1% by mass ($10^6$ cfu/ml) of a seed of pre-cultured Lactococcus lactis was inoculated and statically cultured at 35° C. for 18 hours, followed by sterilizing at 90° C. for 10 minutes (lactic acid fermentation treatment).

After cooling said treated product of lactic acid fermentation to 50° C., 0.35 g (350 units) of a protease (Flavorzyme 1000 L, manufactured by Novozymes) and 0.10 g (1500 units) of a protease (Protease N "Amano" G, manufactured by Amano Enzyme Inc.) were dissolved in 4.00 g of water, followed by adding thereto and stirring at 50° C. for 20 hours to carry out hydrolysis (protease treatment). After inactivating the proteases by treating at 90° C. for 10 minutes, 0.1 part by weight of a total milk protein (manufactured by Nippon Shinyaku Co., Ltd.) was mixed as a carrier based on 1 weight part of said solution, followed by spray-drying to obtain a flavor enhancer b.

Comparative Example 3

Preparation of Flavor Enhancer c 15 g of a skim milk powder (manufactured by Snow Brand Milk Products Co., Ltd.), 20 g (16.6 g milk fat) of salt-free butter (manufactured by Snow Brand Milk Products Co., Ltd.) and 2.0 g of lactose (manufactured by DMV) were dissolved in 63.0 g of water, followed by sterilizing at 90° C. for 10 minutes and cooling to 35° C. Thereafter, 1% by mass ($10^6$ cfu/ml) of a seed of pre-cultured Lactococcus lactis was inoculated and statically cultured at 35° C. for 18 hours, followed by sterilizing at 90° C. for 10 minutes to obtain a treated product of lactic acid fermentation (lactic acid fermentation treatment).

After cooling said treated product of lactic acid fermentation to 50° C., 0.35 g (350 units) of a protease (Flavorzyme 1000 L, manufactured by Novozymes), 0.1 g (1500 units) of a protease (Protease N "Amano" G, manufactured by Amano Enzyme Inc.) and 0.05 g (1500 units) of a lipase (Lipase AY30G, manufactured by Amano Enzyme Inc.) were dissolved in 4.00 g of water, followed by adding to said treated product and stirring at 50° C. for 20 hours to carry out hydrolysis (protease treatment and lipase treatment). After inactivating the proteases and lipase by treating at 90° C. for 10 minutes, a flavor enhancer c was obtained by spray-drying.

Raw materials of the flavor enhancers obtained in Inventive Examples 1 and 2, Production Example 1 and Comparative Examples 1, 2 and 3 and their treating methods are shown in Table 1. These flavor enhancers were added to various kinds of food or drink and subjected to drink sampling or food sampling to carry out sensory evaluation.

TABLE 1

| | Flavor enhancer | Raw material | Treatment |
|---|---|---|---|
| Example 1 | Flavor enhancer A | Total milk protein | Lactic acid fermentation treatment + protease treatment |
| Example 2 | Flavor enhancer B | Total milk protein + milk fat | Lactic acid fermentation treatment + protease treatment + lipase treatment |
| Prod. Ex. 1 | Milk fat lipase-treated product I | Milk fat | Lipase treatment |
| Comp. Ex. 1 | Flavor enhancer a | Whey protein | Lactic acid fermentation treatment + protease treatment |
| Comp. Ex. 2 | Flavor enhancer b | Skim milk powder | Lactic acid fermentation treatment + protease treatment |
| Comp. Ex. 3 | Flavor enhancer c | Skim milk powder + milk fat | Lactic acid fermentation treatment + protease treatment + lipase treatment |

2. Sensory Evaluation

In the sensory evaluation, raw milk feeling, natural feeling, body and preference property were evaluated based on 9 steps of the evaluation points shown in Table 2. The evaluation was carried out through food sampling or drink sampling by three professional panelists, and the evaluation results were expressed as average of the evaluation points.

TABLE 2

| Evaluation | Evaluation points |
|---|---|
| Feel supremely strong/supremely improved | 4 points |
| Feel fairy strong/fairy improved | 3 points |
| Feel a little strong/a little improved | 2 points |
| Feel slightly strong/slightly improved | 1 point |
| The same as no addition | 0 point |
| Feel slightly weak/slightly worsened | −1 point |
| Feel a little weak/a little worsened | −2 points |
| Feel fairy weak/fairy worsened | −3 points |
| Feel very weak/very worsened | −4 points |

3. TEST EXAMPLES

Test Example 1

In Test example 1, a sensory evaluation was carried out by adding the flavor enhancer A, a or b to food or drink (lacto ice, cream stew or Chiffon cake).

Respective food or drink were prepared in the usual way by adding 0.02% by mass of the flavor enhancer A or a to commercially available lacto ice, cream stew or Chiffon cake. Also, respective food or drink was prepared in the usual way by adding 0.02% by mass of the flavor enhancer b to commercially available lacto ice or cream stew. Sensory evaluation was carried out by carrying out drink sampling or food sampling on respective food or drink to which the flavor enhancers were added and on the food or drink without adding, with the results shown in Table 3.

TABLE 3

| Flavor enhancers | Evaluation points | | | |
|---|---|---|---|---|
| | Body | Raw milk feeling | Natural feeling | Preference property |
| Lacto ice | | | | |
| Flavor enhancer A: 0.02% by mass | 3.0 | 3.7 | 3.0 | 3.3 |
| Flavor enhancer a: 0.02% by mass | 1.0 | 1.3 | 1.3 | 1.7 |
| Flavor enhancer b: 0.02% by mass | 0.7 | 0.3 | −1.0 | 0.0 |
| No addition | 0.0 | 0.0 | 0.0 | 0.0 |
| Stew | | | | |
| Flavor enhancer A: 0.02% by mass | 3.7 | 3.3 | 3.3 | 3.7 |
| Flavor enhancer a: 0.02% by mass | 1.7 | 0.7 | 1.7 | 1.7 |
| Flavor enhancer b: 0.02% by mass | 0.7 | 0.0 | −0.7 | 0.3 |
| No addition | 0.0 | 0.0 | 0.0 | 0.0 |
| Chiffon cake | | | | |
| Flavor enhancer A: 0.02% by mass | 3.3 | 3.0 | 3.3 | 3.3 |
| Flavor enhancer a: 0.02% by mass | 0.7 | 0.7 | 1.0 | 1.0 |
| No addition | 0.0 | 0.0 | 0.0 | 0.0 |

As can be seen from Table 3, when the flavor enhancer A was added to food or drink (lacto ice, cream stew and Chiffon cake), raw milk feeling and body became strong, natural feeling was improved and preference property was sharply improved in comparison with the cases of adding the flavor enhancers a and b. Particularly, the flavor enhancer A added excellent natural feeling to food or drink in comparison with the flavor enhancer b.

Test Example 2

In Test example 2, sensory evaluation was carried out by adding a mixture of the flavor enhancer A or a with the milk fat lipase-treated product I to food or drink (sliced cheese, yogurt or pudding).

Respective food or drink were prepared in the usual way by adding 0.007% by mass of the milk fat lipase-treated product I, 0.02% by mass of the flavor enhancer a and 0.007% by mass of the milk fat lipase-treated product I, 0.02% by mass of the flavor enhancer A, 0.02% by mass of the flavor enhancer a, or 0.02% by mass of the flavor enhancer A and 0.007% by mass of the milk fat lipase-treated product I, to commercially available sliced cheese, yogurt or pudding. Sensory evaluation was carried out on respective food or drink to which the flavor enhancers were added and on the food or drink without adding, with the results shown in Table 4.

TABLE 4

| Flavor enhancers | Evaluation points | | | |
|---|---|---|---|---|
| | Body | Raw milk feeling | Natural feeling | Preference property |
| Sliced cheese | | | | |
| Flavor enhancer A: 0.02% by mass + Milk fat lipase-treated product I: 0.007% by mass | 3.3 | 3.0 | 3.0 | 3.7 |
| Flavor enhancer A: 0.02% by mass | 3.0 | 2.3 | 3.0 | 3.0 |
| Flavor enhancer a: 0.02% by mass + Milk fat lipase-treated product I: 0.007% by mass | 2.0 | 1.0 | 1.7 | 2.0 |
| Flavor enhancer a: 0.02% by mass | 1.7 | 1.3 | 1.7 | 1.7 |
| Milk fat lipase-treated product I: 0.007% by mass | 1.0 | 0.3 | 1.3 | 0.7 |
| No addition | 0.0 | 0.0 | 0.0 | 0.0 |
| Yogurt drink | | | | |
| Flavor enhancer A: 0.02% by mass + Milk fat lipase-treated product I: 0.007% by mass | 3.0 | 3.3 | 3.0 | 3.3 |
| Flavor enhancer A: 0.02% by mass | 2.3 | 2.7 | 2.7 | 2.7 |
| Flavor enhancer a: 0.02% by mass + Milk fat lipase-treated product I: 0.007% by mass | 1.3 | 0.7 | 1.0 | 1.0 |
| Flavor enhancer a: 0.02% by mass | 1.0 | 0.7 | 0.7 | 1.0 |
| Milk fat lipase-treated product I: 0.007% by mass | 1.3 | 0.0 | 1.7 | 0.3 |
| No addition | 0.0 | 0.0 | 0.0 | 0.0 |
| Pudding | | | | |
| Flavor enhancer A: 0.02% by mass + Milk fat lipase-treated product I: 0.007% by mass | 3.3 | 3.3 | 3.7 | 3.7 |
| Flavor enhancer A: 0.02% by mass | 2.7 | 2.7 | 2.7 | 2.7 |
| Flavor enhancer a: 0.02% by mass + Milk fat lipase-treated product I: 0.007% by mass | 2.0 | 1.3 | 2.0 | 2.0 |
| Flavor enhancer a: 0.02% by mass | 1.3 | 1.0 | 2.0 | 1.7 |
| Milk fat lipase-treated product I: 0.007% by mass | 1.0 | 0.7 | 1.0 | 1.0 |
| No addition | 0.0 | 0.0 | 0.0 | 0.0 |

As can be seen from Table 4, when the flavor enhancer A and milk fat lipase-treated product I were added to the food or drink, raw milk feeling and body of the food or drink became strong, their natural feeling was improved so that the balance between flavor and taste became good, and their preference property was sharply improved, in comparison with the case of using the milk fat lipase-treated product I alone and the case of concomitantly using the flavor enhancer a and the milk fat lipase-treated product I.

In addition, it was found that body, raw milk feeling, natural feeling and preference property of food or drink are sharply improved when the lipase-treated product I is added to food or drink, together with the flavor enhancer A, in comparison with the case of using the flavor enhancer A alone. On the other hand, when the lipase-treated product I is added to food or drink, together with the flavor enhancer a, changes in the body, raw milk feeling, natural feeling and preference property of food or drink were small and the raw milk feeling was reduced in some cases, in comparison with the case of using the flavor enhancer a alone.

That is, it was found that the body, raw milk feeling, natural feeling and preference property of food or drink (sliced cheese, yogurt and pudding) are considerably improved when a lipase-treated product of a milk fat is blended with a treated product obtained by subjecting a total milk protein to a lactic acid fermentation treatment and a protease treatment.

Test Example 3

In Test example 3, sensory evaluation was carried out by adding, to food or drink (lacto ice, cookie or yogurt drink), a flavor enhancer B obtained by subjecting a mixture of a total milk protein and a milk fat to a lactic acid fermentation treatment, a protease treatment and a lipase treatment.

Respective food or drink were prepared in the usual way by adding 0.02% by mass of the flavor enhancer B to commercially available lacto ice, cookie or yogurt drink. Sensory evaluation was carried out on respective food or drink to which the flavor enhancer was added and on the food or drink without adding, with the results shown in Table 5.

TABLE 5

| Flavor enhancers | Body | Raw milk feeling | Natural feeling | Preference property |
|---|---|---|---|---|
| Lacto ice | | | | |
| Flavor enhancer B: 0.02% by mass | 4.0 | 3.3 | 3.3 | 4.0 |
| No addition | 0.0 | 0.0 | 0.0 | 0.0 |
| Yogurt drink | | | | |
| Flavor enhancer B: 0.02% by mass | 3.7 | 3.3 | 3.3 | 4.0 |
| No addition | 0.0 | 0.0 | 0.0 | 0.0 |
| Cookie | | | | |
| Flavor enhancer B: 0.02% by mass | 3.7 | 3.3 | 3.7 | 3.7 |
| No addition | 0.0 | 0.0 | 0.0 | 0.0 |

As can be seen from Table 5, when the flavor enhancer B was added to the food or drink, raw milk feeling and body became strong, natural feeling was improved so that the balance between flavor and taste became good, and preference property was sharply improved, in comparison with the case of using the products without adding. That is, it was found that body, raw milk feeling, natural feeling and preference property of food or drink (lacto ice, cookie and yogurt drink) are improved by the flavor enhancer B obtained by subjecting a mixture of a total milk protein and a milk fat to a lactic acid fermentation treatment, a protease treatment and a lipase treatment.

Test Example 4

In Test example 4, sensory evaluation was carried out by adding, to food or drink (Chiffon cake or long tin), the a flavor enhancer B obtained by subjecting a mixture of a total milk protein and a milk fat to a lactic acid fermentation treatment, a protease treatment and a lipase treatment or a flavor enhancer c obtained by subjecting a mixture of skim milk powder and a milk fat to a lactic acid fermentation treatment, a protease treatment and a lipase treatment.

Respective food or drink were prepared in the usual way by adding 0.02% by mass of the flavor enhancer B or flavor enhancer c to commercially available Chiffon cake or long tin. Sensory evaluation was carried out by carrying out drink sampling or food sampling on respective food or drink to which the flavor enhancers were added and on the food or drink without adding, with the results shown in Table 6.

TABLE 6

| Flavor enhancers | Body | Raw milk feeling | Natural feeling | Preference property |
|---|---|---|---|---|
| Chiffon cake | | | | |
| Flavor enhancer B: 0.02% by mass | 4.0 | 3.7 | 4.0 | 4.0 |
| Flavor enhancer c: 0.02% by mass | 1.0 | 0.3 | 1.0 | 0.7 |
| No addition | 0.0 | 0.0 | 0.0 | 0.0 |
| Long tin | | | | |
| Flavor enhancer B: 0.02% by mass | 3.7 | 3.0 | 3.3 | 3.7 |
| Flavor enhancer c: 0.02% by mass | 1.0 | 0.7 | 1.0 | 1.0 |
| No addition | 0.0 | 0.0 | 0.0 | 0.0 |

As can be seen from Table 6, when the flavor enhancer B was added to Chiffon cake and long tin, raw milk feeling and body became strong, natural feeling was improved so that the balance between flavor and taste became good, and preference property was sharply improved, in comparison with the case of adding the flavor enhancer c.

That is, it was found that body, raw milk feeling, natural feeling and preference property of food or drink (Chiffon cake and long tin) are markedly improved by the flavor enhancer obtained by subjecting a mixture of a total milk protein and a milk fat to a lactic acid fermentation treatment, a protease treatment and a lipase treatment, in comparison with the flavor enhancer obtained by subjecting a mixture of skim milk powder and a milk fat to a lactic acid fermentation treatment, a protease treatment and a lipase treatment.

While the invention has been described in detail and with reference to specific embodiments thereof, it will be apparent to one skilled in the art that various changes and modifications can be made therein without departing from the spirit and scope thereof. The present application is based on Japanese Patent Application No. 2007-109640 filed on Apr. 18, 2007, and the contents are incorporated herein by reference.

The invention claimed is:

1. A flavor enhancer, which comprises an effective flavoring component obtained by subjecting a total milk protein to a lactic acid fermentation treatment employing a lactic acid bacterium, and a protease treatment, in this order,
    wherein the lactic acid fermentation treatment is carried out for 4 to 75 hours; and
    wherein the lactic acid bacterium in the lactic acid fermentation treatment is selected from the group consisting of a bacterium of genus *Lactobacillus*, a bacterium of genus *Streptococcus*, and a bacterium of genus *Lactococcus*,
    wherein said flavor enhancer, when added to a food or drink, enhances or increases a raw milk feeling and a rich feeling of a raw milk in a food or drink.

2. The flavor enhancer according to claim 1, which further comprises a lipase-treated product of a milk fat as an effective component.

3. A flavor enhancer, which comprises an effective flavoring component obtained by subjecting a mixture of a total milk protein and a milk fat to a lactic acid fermentation treatment employing a lactic acid bacterium and a protease treatment in this order, in which a lipase treatment is performed simultaneously with the protease treatment; and wherein the lactic acid fermentation treatment is carried out for 4 to 75 hours,
    wherein the lactic acid bacterium in the lactic acid fermentation treatment is selected from the group consisting of a bacterium of genus *Lactobacillus*, a bacterium of genus *Streptococcus*, and a bacterium of genus *Lactococcus*, wherein said flavor enhancer, when added to a food or drink, enhances or increases a raw milk feeling and a rich feeling of a raw milk in a food or drink.

4. A food or drink, which comprises the flavor enhancer according to any one of claims 1 to 3.

5. A method for producing a flavor enhancer for food or drink, which comprises:

subjecting a total milk protein to a lactic acid fermentation treatment employing a lactic acid bacterium and a protease treatment in this order to obtain a treated product as a flavoring component; and wherein the lactic acid fermentation treatment is carried out for 4 to 75hours, wherein the lactic acid bacterium in the lactic acid fermentation treatment is selected from the group consisting of a bacterium of genus *Lactobacillus*, a bacterium of genus *Streptococcus*, and a bacterium of genus *Lactococcus*, wherein said flavor enhancer, when added to a food or drink, enhances or increases a raw milk feeling and a rich feeling of a raw milk in a food or drink.

6. The method according to claim 5, which further comprises adding a lipase-treated product of a milk fat to the treated product.

7. A method for producing a flavor enhancer for food or drink, which comprises:

(1) preparing a mixed solution which comprises a total milk protein and a milk fat; and (2) subjecting the mixed solution prepared by the step (1) to a lactic acid fermentation treatment employing a lactic acid bacterium and a protease treatment in this order, in which a lipase treatment is performed simultaneously with the protease treatment; and wherein the lactic acid fermentation treatment is for 4 to 75 hours, wherein the lactic acid bacterium in the lactic acid fermentation treatment is selected from the group consisting of a bacterium of genus *Lactobacillus*, a bacterium of genus *Streptococcus*, and a bacterium of genus *Lactococcus*, wherein said flavor enhancer, when added to a food or drink, enhances or increases a raw milk feeling and a rich feeling of a raw milk in a food or drink.

8. A method for enhancing or increasing a raw milk feeling and a rich feeling of a raw milk in a food or drink, which comprises adding a flavor enhancer to the food or drink, wherein the flavor enhancer comprises an effective flavoring component obtained by subjecting a total milk protein to a lactic acid fermentation treatment employing a lactic acid bacterium and a protease treatment in this order;

wherein the lactic acid fermentation treatment is carried out for 4 to 75 hours; and wherein the lactic acid bacterium in the lactic acid fermentation treatment is selected from the group consisting of a bacterium of genus *Lactobacillus*, a bacterium of genus *Streptococcus*, and a bacterium of genus *Lactococcus*.

9. The method according to claim 8, which further comprises adding a lipase-treated milk fat as an effective component.

10. A method for enhancing or increasing a raw milk feeling and a rich feeling of a raw milk in a food or drink, which comprises adding an effective amount of a flavoring component, said flavoring component being obtained by subjecting a mixture of a total milk protein and a milk fat to a lactic acid fermentation treatment employing a lactic acid bacterium and a protease treatment in this order, in which a lipase treatment is performed with the protease treatment; and wherein the lactic acid fermentation treatment is carried out for 4 to 75 hours, wherein the lactic acid bacterium in the lactic acid fermentation treatment is selected from the group consisting of a bacterium of genus *Lactobacillus*, a bacterium of genus *Streptococcus*, and a bacterium of genus *Lactococcus*.

\* \* \* \* \*